Jan. 22, 1957    J. R. CHOTRO    2,779,013
OVERLOAD INDICATOR
Filed April 13, 1955    2 Sheets-Sheet 1
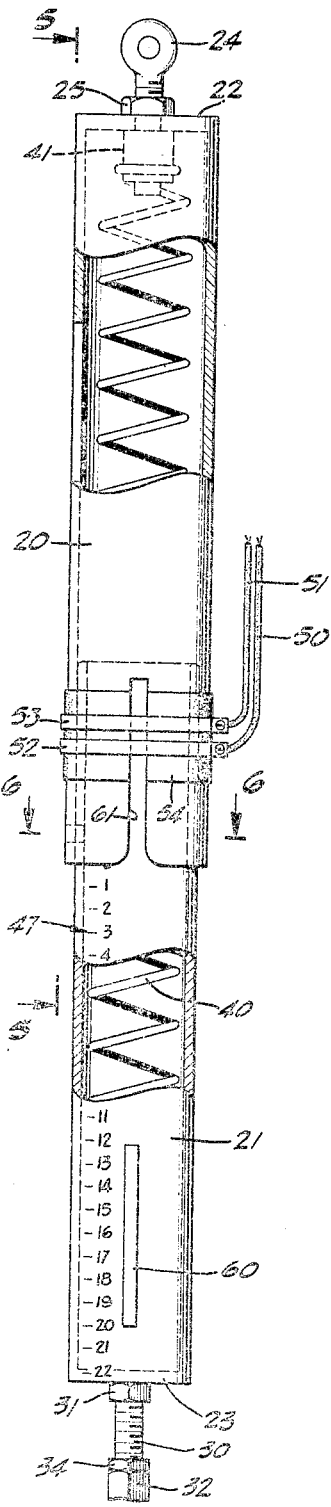
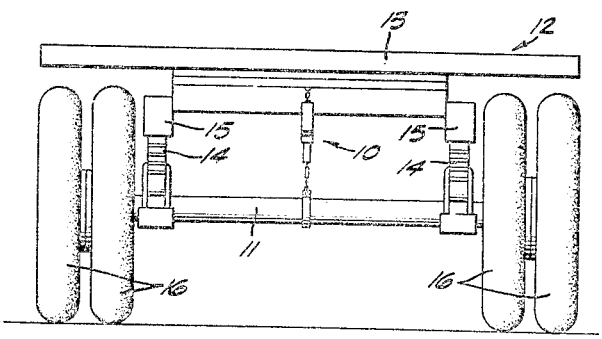
JOSEPH R. CHOTRO
INVENTOR.
BY *Herbert E. Kidder*
AGENT

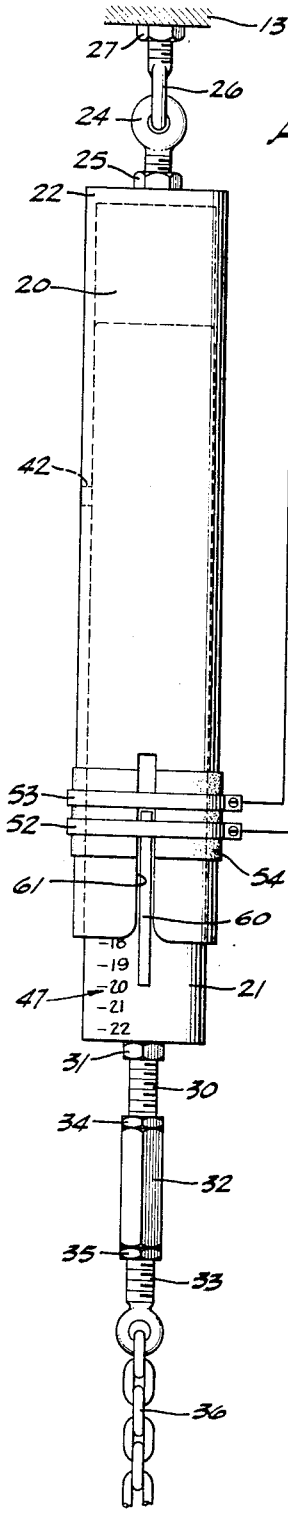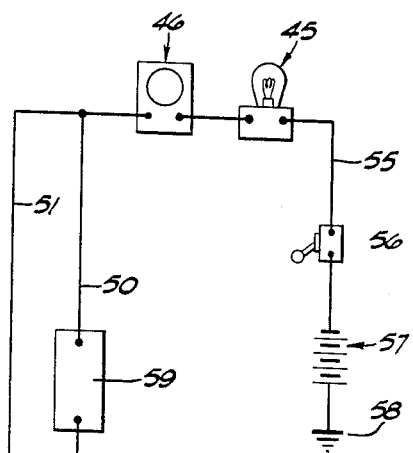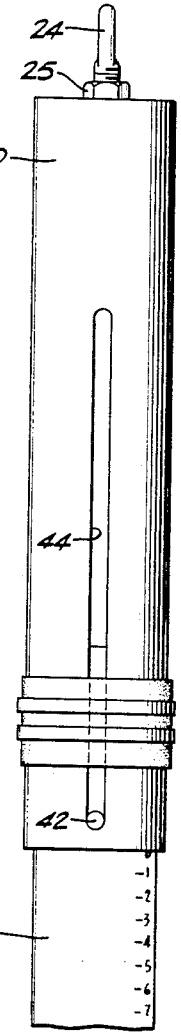

United States Patent Office 2,779,013
Patented Jan. 22, 1957

2,779,013

OVERLOAD INDICATOR

Joseph R. Chotro, Riverside, Calif.

Application April 13, 1955, Serial No. 501,093

3 Claims. (Cl. 340—52)

The present invention relates to overload indicators for trucks, trailers, and the like, and its primary object is to provide a simple yet effective device that can be mounted on the vehicle to provide a suitable warning when the vehicle is loaded to a predetermined maximum weight on each axle. The purpose of this arrangement is to enable the truck operator to load his truck or trailer to the maximum allowable pay load for maximum revenue, without exceeding the legal weight limits specified by state highway codes. These legal weight limits are established to prevent damage to payvement and roadbeds, and are usually specified in terms of maximum load per wheel or axle.

To detect violation of the legal weight limits, most of the states have check stations at key points along the highways, where trucks are required to be driven onto scales so as to check the load per wheel. If a truck is found to be illegally loaded, it is detained until another truck can be despatched to take off part of the load, and the driver is issued a citation which carries with it a substantial fine that may take the entire profit of that trip. The truck operators are therefore vitally concerned with the problem of staying within legal weight limits, and will not knowingly load their trucks beyond that legal limit.

The larger trucking concerns, knowing that they cannot operate profitably if periodically penalized for illegal loading, have their own private scales, while smaller operators usually make use of public scales. However, in many localities there are no public scales within reasonable distance of the loading area, while in other instances, loading is done at night when public scales are closed. In such situations, the operator has no alternative but to rely upon his own judgement and hope for the best.

Even the most experienced operators have found this loading by estimate a precarious proposition. A total load that would be well within the legal limit if uniformly distributed on all wheels may be illegally overloaded on one axle if improperly distributed. Shifting loads are frequently responsible for illegal overloads, even though the vehicle was within the legal limits at the time it was loaded. Thus, the problem of obtaining maximum freight revenues without exceeding legal weight limits is not a simple matter, and truck oeprators have frequently been put to considerable expense and inconvenience as a result of misjudgement in loading, or shifting of the load.

The present invention makes use of the principle that the deflection of the springs and shock absorbers to which an axle is connected is directly proportional to the load applied to the axle. The invention is therefore in the nature of a device that is attached to the axle and the truck body for measuring the deflection of the springs under load, and actuating a warning signal when the spring deflection approaches or reaches a predetermined limit. In the preferred form of the invention, a warning signal, such as a flashing light and intermittent buzzing sound, is given when the axle is loaded to within any desired weight short of the legal limit, followed by a second signal, such as a steady burning light and continuous buzzing sound, when the legal weight limit is reached. This enables the operator to determine when the vehicle is loaded almost to the limit, so that a suitable margin of safety can be left, or further loading can be undertaken with proper regard for the limited remaining capacity. A switch may be provided for turning off the warning signals when the truck is under way.

The foregoing and other objects and advantages of the invention will become apparent to those skilled in the art upon consideration of the following detailed description of a preferred embodiment thereof, reference being had to the accompanying drawings, wherein Figure 1 is a fragmentary sectional view through one of the axles and a portion of the body of a truck or trailer, showing the manner in which the device of the invention is attached to one axle and the body of the vehicle;

Figure 2 is a rear end view of the same;

Figure 3 is an enlarged, partially cut-away view of the device of the invention, showing the same fully extended, as when there is no load on the vehicle;

Figure 4 is an elevational view of the same, with a schematic representation of the warning devices, and showing the device compressed, as when the vehicle is loaded to approximately the maximum legal limit for that axle;

Figure 5 is a side elevational view of the device, as seen at 5—5 in Figure 3, showing the guide pin and slot that prevent the relatively movable parts from turning with respect to one another; and Figure 6 is a sectional view, taken at 6—6 in Figure 3.

In the drawings, the device of the invention is designated in its entirety by the reference numeral 10, and as shown in Figures 1 and 2, is connected at its bottom end to the axle housing 11 of a vehicle 12, and at the top end thereof to the body 13 of the vehicle. The vehicle 12 may be any conventional load-carrier, such as a truck, trailer, semitrailer, or the like having a body 13, springs 14 connected to the body by shackles 15, one or more axle housings 11 attached to the springs, and wheels 16 rotatably mounted on the axle housings.

The device 10 comprises two relatively movable members 20 and 21 which, in the preferred embodiment shown, consist of two telescoping tubular members, the outer ends of which are closed at 22 and 23 respectively. The lower tube 21 fits snugly within the upper tube 22 and slides freely therein. Screwed into the closed end 22 of the upper tube 20 is an eye bolt 24, which is secured by a lock nut 25. The eye of the eye bolt 24 passes through another eye bolt 26 (Figure 4), which is screwed into the body 13 of the vehicle, and is secured by a lock nut 27.

Screwed into the closed bottom end 23 of the lower tube 21 is a threaded stud 30, which is secured against turning by a lock nut 31. A turnbuckle 32 is screwed onto the bottom end of the stud 30, and an eye bolt 33 is threaded into the bottom end of the turnbuckle. Lock nuts 34 and 35 keep the turnbuckle from turning on the stud 30 and eye bolt 33. A chain 36, or other flexible member, passes through the eye bolt 33 and is wrapped around or otherwise secured to the axle housing 11.

Disposed within the telescoping tubes 20 and 21 is a tension spring 40, the top end of which is provided with a fitting 41 that is threaded onto the inwardly projecting end of the eye bolt 24; while the bottom end thereof is similarly attached to the inwardly projecting end of the stud 30 (Figure 6). The spring 40 exerts a pull on the two tubes 20, 21, urging them to come together, and the pull of the spring is resisted by the attachments at opposite ends of the tubes, which are secured to the vehicle body and to the axle housing. The lower tube 21 is preferably, although not necessarily, stamped with longitudinally spaced index marks and numerals, as shown at 47, dividing the travel of the tube into thousand pound increments of load, so that the operator can determine the approximate load on the wheels at any stage of loading.

The two tubes 20, 21, are prevented from turning with respect to one another by means of a pin 42, which is pressed into a hole 43 in the inner tube 21 and projects outwardly therefrom through a longitudinally extending slot 44 in the outer tube 20; the outer end of the pin being flush with the outer surface of the tube 20. The pin 42 may be welded or otherwise secured to the inner tube 21. The length of the slot 44 is such that the pin 42 is free to slide therein for the full length of travel of the tube 21 with respect to the tube 20.

The warning signal given by the device may take any desired form, but in the preferred embodiment of the invention, I have shown a combination of a light 45 and a buzzer 46, which are connected by wires 50 and 51 to two spaced copper bands 52 and 53 that are wrapped around the outer end of the tube 20 near the lower end thereof. The bands 52, 53 are insulated from the tube 20 by an insulating collar 54. The light 45 is preferably mounted in the driver's cab, while the buzzer 46 is located where it will be clearly audible throughout the vehicle during loading. The light 45 and buzzer 46 are connected by a wire 55 to a switch 56, which is connected, in turn, to the "hot" side of a battery 57; the latter being grounded to the frame of the vehicle at 58. A flasher unit 59 is connected in series with the line 50.

A contact bar 60, which is grounded to the vehicle frame, is attached to the outer surface of the lower tube 21 near the bottom end thereof, and extends longitudinally of the tube. The contact bar projects outwardly from the surface of the tube 21 a sufficient distance to wipe on the inside surface of the bands 52, 53 when the tubes are telescoped together, and a slot 61 is provided in the bottom end of the outer tube 20 to receive the contact bar 60 and permit it to pass up to and slightly beyond the top band 53. The insulating collar 54 is also cut away where it crosses the slot 61, so that the grounding bar 60 is free to contact the bands 52, 53. The bottom end of the slot 61 is flared slightly, to lead the contact bar 60 into the slot in case of slight misalignment.

As the contact bar 60 engages the bottom band 52, the circuit of the light 45 and buzzer 46 is closed through wire 50 and flasher unit 59, causing the light to flash on and off, and the buzzer to sound intermittently. When the contact bar 60 engages the top band 53, the circuit is closed through wire 51, causing the light 45 to burn steadily and the buzzer 46 to sound continuously.

At the time the overload indicator 10 is first mounted on the vehicle, the latter is driven onto scales and is loaded to the exact legal limit for the wheels 16. At this point, the springs 14 are deflected to a considerable extent, and under normal conditions the springs will deflect to the same extent whenever the vehicle is loaded to the legal limit.

Prior to being attached to body and axle of the vehicle, the device 10 is fully contracted by the spring 40. The top eye bolt 26 is first secured in the vehicle body 13; lower tube 21 is then pulled down slightly to bring tension on spring 40; and flexible connector 36 is securely fastened to the axle housing 11. Next, by means of a turnbuckle 32, bottom tube 21 is raised or lowered with respect to the top tube so that the numeral 47 appearing at the bottom edge of outer tube 20 corresponds with weight imposed upon road surface by wheels 16.

The adjustable metal band 53 is then slipped down on tube 20 so that it touches the top of contact bar 60, causing the light 45 to burn steadily and the buzzer 46 to sound continuously.

The lower band 52 is spaced downwardly from the top band 53 a distance corresponding to the rise of the vehicle body on the springs 14 when the load on the vehicle has been reduced by some predetermined amount, such as 1500 pounds, which will give adequate warning that the maximum load is being approached.

While the installation shown in Figure 2 depicts its use upon a single axle 11, the present invention may also be used with tandem axles by connecting an additional member between the axles, so that the device 10 may be centered between axles and also located midway between the wheels to give a reasonably accurate measurement of the load distribution, even when the wheels rest upon uneven ground.

Once the device 10 has been installed on a vehicle and properly adjusted, loading is done in the usual manner. As the load approaches the maximum safe limit, the grounding contact 60 approaches and finally touches the bottom band 52. This closes the circuit to the light 45 and buzzer 46 through the flasher unit 59, causing the light to flash on and off, and the buzzer to sound intermittently to give warning that the weight on the axle is within a predetermined number of pounds of the legal limit.

As the load upon the vehicle is increased, the grounding contact 60 moves up to and touches the upper band 53, causing the light 45 and buzzer 46 to remain on continuously, thereby giving warning that the maximum safe limit has been reached. The switch 55 enables the warning signals to be turned off when the vehicle is under way, so that the driver will not be distracted by the flashing light or buzzer.

While I have shown and described in considerable detail what I believe to be the preferred embodiment of my invention, it will be understood that such details are merely illustrative, and that various changes may be made in the shape and arrangement of the several parts without departing from the scope of the appended claims.

I claim:

1. A device of the class described for use with a vehicle having a body, an axle connected to said body by springs, and wheels rotatably mounted on said axle, said device comprising a pair of telescoping tubular members, one of said members being attached to said body, a flexible connection securing the other of said members to said axle, a tension spring enclosed within and attached to said tubular members, said spring yieldingly urging said members together, means preventing rotation of said tubular members with respect to one another, a preliminary warning indicator and an overload indicator, and an electrical circuit connected to said indicators and including a pair of longitudinally spaced contacts on one of said tubular members and a third contact on the other member to successively engage first one and then the other of said spaced contacts as said members are moved together, said one contact being connected to said preliminary warning indicator, and said other contact being connected to said overload indicator, said third contact engaging said one contact to actuate said preliminary warning indicator when said springs have been deflected a predetermined amount by a maximum safe load on said vehicle body, and said third contact engaging said other contact to actuate said overload indicator when said springs have been deflected an additional amount by an illegal overload on said vehicle body.

2. An overload indicator for use with a vehicle having a body, an axle connected to said body by springs, and wheels rotatably mounted on said axle, said overload indicator comprising a pair of telescoping tubular members, one of said members being attached to said body and the other being connected to said axle, the outer tubular member having a longitudinal slot extending from the end thereof into which the inner tubular member is telescoped, a pair of longitudinally spaced contacts bridging said slot, one contact adjacent the end of said slot being electrically connected to a preliminary warning indicator, the other contact being electrically connected to an overload indicator, a third contact member on the inner tubular member in alignment with said slot, said third contact member being connected to a source of eelctrical energy and being adapted to successively engage first one and then the other of said spaced contacts as said tubular members are moved together to actuate said preliminary warning indicator when said springs have been deflected a predetermined amount by a maximum safe load on said axle, and then actuate said overload indicator when said springs have been deflected an additional amount by an illegal overload on said axle.

3. A device as in claim 2, wherein one of said tubular members has a plurality of longitudinally spaced indicia provided thereon, and a reference point on the other tubular member coacting with said indicia to give a visual indication of the weight on the axle as the vehicle is loaded.

References Cited in the file of this patent
FOREIGN PATENTS 57,349    Denmark _____ Mar. 4, 1940